United States Patent
Saito et al.

(10) Patent No.: US 7,390,539 B2
(45) Date of Patent: Jun. 24, 2008

(54) LIQUID CRYSTAL COMPOSITION AND LIQUID CRYSTAL DISPLAY DEVICE

(75) Inventors: Masayuki Saito, Chiba (JP); Yoshitaka Tomi, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 36 days.

(21) Appl. No.: 11/484,739

(22) Filed: Jul. 12, 2006

(65) Prior Publication Data

US 2007/0012898 A1   Jan. 18, 2007

(30) Foreign Application Priority Data

Jul. 13, 2005   (JP)   ............... 2005-204329

(51) Int. Cl.
C09K 19/30   (2006.01)
C09K 19/20   (2006.01)
C09K 19/52   (2006.01)

(52) U.S. Cl. ............... 428/1.1; 252/299.01; 252/299.63; 252/299.67

(58) Field of Classification Search ............... 428/1.1; 252/299.5, 299.63, 299.66, 299.67, 299.01
See application file for complete search history.

(56) References Cited

U.S. PATENT DOCUMENTS

| | | | |
|---|---|---|---|
| 5,965,060 A | 10/1999 | Tarumi et al. | |
| 6,376,030 B1 | 4/2002 | Heckmeier et al. | |
| 6,740,369 B2 * | 5/2004 | Klasen-Memmer et al. | 428/1.1 |
| 6,896,939 B2 * | 5/2005 | Klasen-Memmer et al. | 428/1.1 |
| 6,921,560 B2 * | 7/2005 | Okabe et al. | 428/1.1 |
| 6,929,832 B2 * | 8/2005 | Heckmeier et al. | 428/1.1 |
| 6,933,022 B2 * | 8/2005 | Klasen-Memmer et al. | 428/1.1 |
| 7,291,368 B2 * | 11/2007 | Yamamoto et al. | 428/1.1 |
| 7,306,831 B1 * | 12/2007 | Yamamoto | 428/1.1 |
| 2002/0014613 A1 | 2/2002 | Klasen et al. | |
| 2003/0039769 A1 | 2/2003 | Lee et al. | |
| 2003/0134055 A1 * | 7/2003 | Heckmeier et al. | 428/1.1 |
| 2003/0222245 A1 * | 12/2003 | Klasen-Memmer et al. | 252/299.66 |
| 2004/0146662 A1 * | 7/2004 | Klasen-Memmer et al. | 428/1.1 |
| 2004/0155223 A1 * | 8/2004 | Okabe et al. | 252/299.63 |

* cited by examiner

Primary Examiner—Shean C Wu
(74) Attorney, Agent, or Firm—Hogan & Hartson LLP

(57) ABSTRACT

A liquid crystal composition having a negative dielectric anisotropy and containing at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formula (4) as a fourth component:

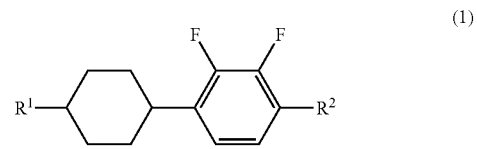

(1)

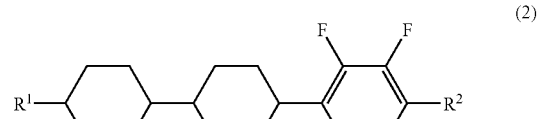

(2)

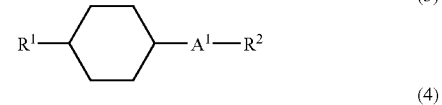

(3)

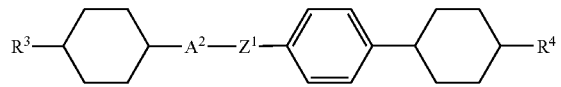

(4)

wherein the liquid crystal composition consists essentially of the first component, the second component, the third component and the fourth component and wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

14 Claims, No Drawings

ID_CRYSTAL COMPOSITION AND
LIQUID CRYSTAL DISPLAY DEVICE

CROSS REFERENCE TO RELATED APPLICATIONS

This application claims priority under 35 U.S.C. § 119 to Japanese Patent Application No. JP 2005-204329, filed Jul. 13, 2005, which application is expressly incorporated herein by reference in its entirety.

BACKGROUND OF THE INVENTION

1. Field of the Invention

The invention relates to a liquid crystal composition suitable for use in an AM (active matrix) device and an AM device containing the composition. In particular, the invention relates to a liquid crystal composition having a negative dielectric anisotropy and a device having an IPS (in-plane switching) mode or a VA (vertical alignment) mode containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon, polycrystal silicon and continuous grain silicon. The polycrystal silicon is classified into a high temperature type and a low temperature type according to a production process. Classification based on a light source includes a reflection type utilizing natural light, a transmission type utilizing a backlight, and a semi-transmission type utilizing both natural light and a backlight.

These devices contain a liquid crystal composition having suitable characteristics. General characteristics of the composition should be improved to obtain an AM device having good general characteristics. Table 1 below summarizes the relationship between the general characteristics of the composition and the AM device. The general characteristics of the composition will be explained further based on a commercially available AM device. The temperature range of a nematic phase relates to the temperature range, in which the device can be used. The desirable maximum temperature of a nematic phase is approximately 70° C. or more, and a desirable minimum temperature of a nematic phase is approximately −20° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General characteristics of liquid crystal composition and AM device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |

TABLE 1-continued

General characteristics of liquid crystal composition and AM device

| No | General Characteristics of a Composition | General Characteristics of an AM Device |
|---|---|---|
| 3 | Optical anisotropy is suitable | Contrast ratio is large |
| 4 | Dielectric anisotropy is large in positive or negative | Driving voltage is low, electric power consumption is small |
| 5 | Specific resistance is large | Voltage holding ratio is large and a contrast ratio is large |

[1] A liquid crystal composition can be injected into a cell in a short time.

The optical anisotropy of the composition relates to the contrast ratio of the device. Devices having a VA mode, an IPS mode, and so forth utilize electrically controlled birefringence. In order to maximize a contrast ratio of a device having a VA mode, an IPS mode, and so forth, a product (Δn·d) of the optical anisotropy (Δn) of the composition and the cell gap (d) of the device is designed to be a constant value. Examples of the value include from approximately 0.30 μm to approximately 0.35 μm (VA mode) and from approximately 0.20 μm to approximately 0.30 μm (IPS mode). Since the cell gap (d) is generally from approximately 3 μm to approximately 6 μm, the optical anisotropy of the composition is generally from approximately 0.05 to approximately 0.11. A large dielectric anisotropy of the composition contributes to a small driving voltage of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after use for a long period of time. Since an ultraviolet ray is used on producing a device, a composition having a large specific resistance is desirable at room temperature and also at a high temperature after irradiation with an ultraviolet ray.

A composition having a positive dielectric anisotropy is used in an AM device having a TN mode. On the other hand, a composition having a negative dielectric anisotropy is used in an AM device having a VA mode. A composition having a positive or negative dielectric anisotropy is used in an AM device having an IPS mode. A liquid crystal composition having a negative dielectric anisotropy is disclosed in the following patent documents: JP H10-176167 A/1998, JP 2000-96055 A/2000, JP 2001-354967 A/2001 and JP 2003-13065 A/2003.

SUMMARY OF THE INVENTION

The invention relates to a liquid crystal composition having a negative dielectric anisotropy and containing at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formula (4) as a fourth component,

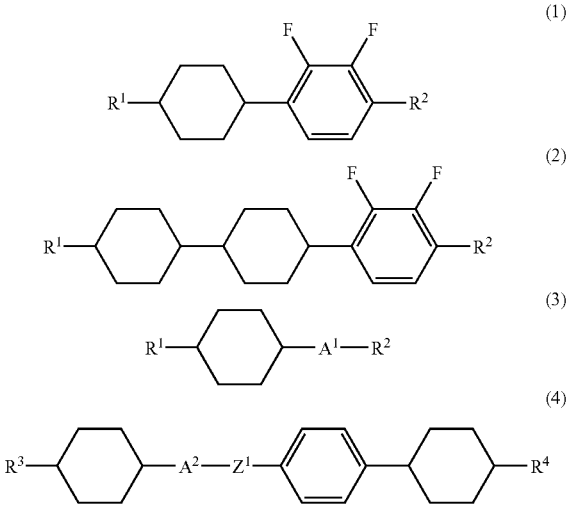

wherein the liquid crystal composition consists essentially of the first component, the second component, the third component and the fourth component and wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

The inventions also relates to a liquid display device comprising the liquid crystal composition, and so forth.

DETAILED DESCRIPTION OF THE INVENTION

The liquid crystal composition of the invention or the liquid crystal display device of the invention may occasionally be expressed simply as "the composition" or "the device," respectively. A liquid crystal display device is a generic term for a liquid crystal display panel and a liquid crystal display module. The main components of the liquid crystal composition are liquid crystal compounds. The liquid crystal compound is a generic term for a compound having a liquid crystal phase such as a nematic phase at 25° C., a nematic phase at 25° C. and so forth, and also for a compound having no liquid crystal phase at 25° C. but being useful as a component of a composition. The phrase "at least one compound selected from a group of compounds represented by formula (1)" may be abbreviated to "the compound (1)." The other formulas are applied with the same rule.

The term "at least one compound selected from a group of compounds represented by formulas (1) and (2)" has three meanings, i.e., a case where a compound is selected only from a group of compounds represented by formula (1), a case where a compound is selected only from a group of compounds represented by formula (2), and a case where a compound is selected from a group of compounds represented by both of formulas (1) and (2). The other formulas are applied with the same rule.

The term "essentially" means that the composition is primarily, but not exclusively, constituted by compounds selected from the compounds (1) to (4) but that the composition may further contain other compounds (e.g., an additive, an impurity, and so forth). The additive can include optically active compounds, antioxidant compounds, coloring matters, and so forth. The impurity is a compound and so forth contaminated in the process such as the synthesis of a component compound and so forth.

In the case where the first component is a single compound, the term "the ratio of the first component" means the ratio of the compound. In the case where the first component includes two or more compounds, it means the total ratio of the compounds constituting the first component. The other components are applied with the same rule.

The term "at least one compound selected from the group of compounds represented by formula (2-2) as the second component" means that the second component is selected only from formula (2-2), and the second component does not contain other compounds than those of formula (2-2). The other components and the other formulas are applied with the same rule.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time, and the composition has a large specific resistance at room temperature and also at a high temperature even after it is irradiated with an ultraviolet ray. "A voltage holding ratio is large" means that an device has a large voltage holding ratio at room temperature and also at a high temperature in the initial stage, the device has a large voltage holding ratio at room temperature and also at a high temperature even after it has been used for a long time, and the device has a large voltage holding ratio at room temperature and also at a high temperature even after it is irradiated with an ultraviolet ray. In the descriptions herein, the characteristics of the composition such as the optical anisotropy and so forth are values measured in the methods disclosed in Examples. The content (percentage) of a liquid crystal compound in a composition means the percentage by weight (% by weight) based on the total weight of liquid crystal compounds.

An advantage of the invention is to provide a liquid crystal composition that satisfies many characteristics among the characteristics such as a high maximum temperature of a nematic phase, a low minimum temperature of a nematic phase, a small viscosity, a suitable optical anisotropy, a negatively large dielectric anisotropy, a small frequency dependency of a dielectric anisotropy, a small temperature dependency of a threshold voltage and a large specific resistance. One aspect of the invention is to provide, for example, a liquid crystal composition properly balanced regarding many characteristics. Another aspect of the invention is to provide a liquid crystal display device, for example, containing such a composition and having a large voltage holding ratio. A further aspect of the invention is to provide an AM device, for example, containing a composition with a minimum temperature of a nematic phase of approximately −30° C. or less, a maximum temperature of a nematic phase of approximately 100° C. or more, a small viscosity, an optical anisotropy ranging from approximately 0.05 to approximately 0.11 and a dielectric anisotropy ranging from approximately −6.5 to approximately −2.0, and being suitable, for example, for a VA mode, an IPS mode and so forth.

The invention relates to a liquid crystal composition having a negative dielectric anisotropy and containing at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formula (4) as a fourth component:

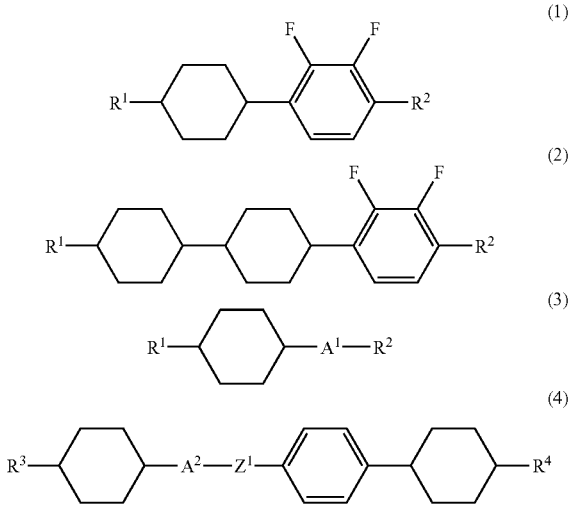

wherein the liquid crystal composition consists essentially of the first component, the second component, the third component and the fourth component and wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

The invention also relates to a liquid crystal display device containing the composition.

The liquid crystal composition of the invention satisfies many characteristics among the characteristics such as a high maximum temperature of a nematic phase, a low minimum temperature of a nematic phase, a small viscosity, a suitable optical anisotropy, a negatively large dielectric anisotropy, a small frequency dependency of a dielectric anisotropy, a small temperature dependency of a threshold voltage and a large specific resistance. The composition is, for example, properly balanced regarding many characteristics. The device contains such a composition. The invention further includes a device containing a composition, for example, with a minimum temperature of a nematic phase of approximately −30° C. or less, a maximum temperature of a nematic phase of approximately 100° C. or more, a small viscosity, an optical anisotropy ranging from approximately 0.05 to approximately 0.11 and a dielectric anisotropy ranging from approximately −6.5 to approximately −2.0 has a large voltage holding ratio and is suitable, for example, for a VA mode, an IPS mode and so forth.

The invention includes:

1. A liquid crystal composition having a negative dielectric anisotropy and containing at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formula (4) as a fourth component,

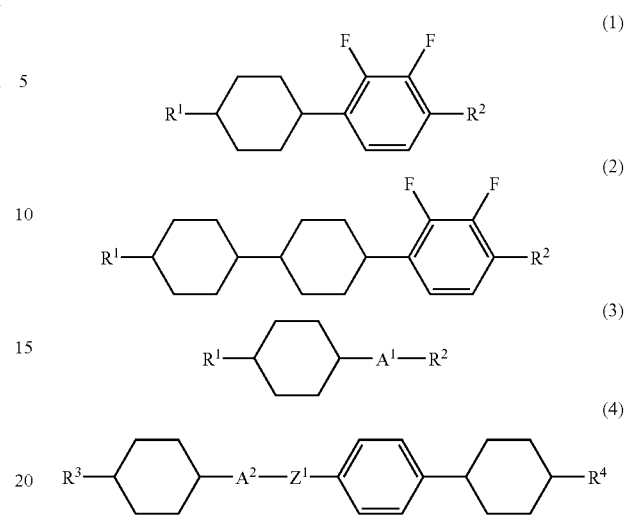

wherein the liquid crystal composition consists essentially of the first component, the second component, the third component and the fourth component and wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

2. The liquid crystal composition according to item 1, wherein the ratio of the first component is in the range of from approximately 20% to approximately 50% by weight, the ratio of the second component is in the range of from approximately 15% to approximately 40% by weight, the ratio of the third component is in the range of from approximately 5% to approximately 35% by weight and the ratio of the fourth component is in the range of from approximately 5% to approximately 30% by weight, based on the total weight of the liquid crystal compounds.

3. A liquid crystal composition having a negative dielectric anisotropy and comprising at least one compound selected from a group of compounds represented by formula (1-2) as a first component, at least one compound selected from a group of compounds represented by formulas (2-1) and (2-2) as a second component, at least one compound selected from a group of compounds represented by formulas (3-1) to (3-3) as a third component and at least one compound selected from a group of compounds represented by formula (4-1) as a fourth component:

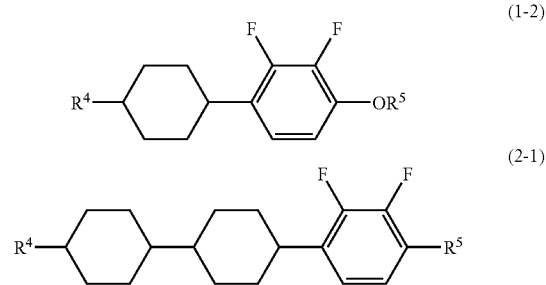

-continued

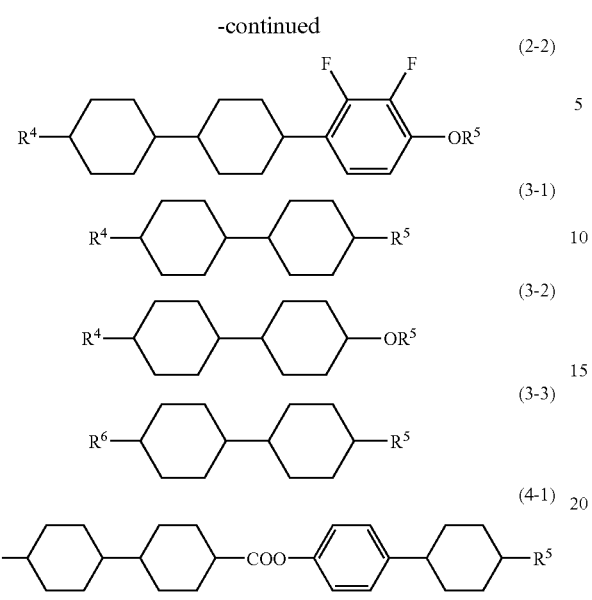

wherein the liquid crystal composition consists essentially of the first component, the second component, the third component and the fourth component and wherein $R^4$ and $R^5$ are independently alkyl; and $R^6$ is alkenyl.

4. The liquid crystal composition according to item 3, wherein the second component is at least one compound selected from a group of compounds represented by formula (2-2).

5. The liquid crystal composition according to item 3, wherein the second component is at least one compound selected from a group of compounds represented by formula (2-1) and at least one compound selected from a group of compounds represented by formula (2-2).

6. The liquid crystal composition according to any one of items 3 to 5, wherein the ratio of the first component is in the range of from approximately 20% to approximately 50% by weight, the ratio of the second component is in the range of from approximately 15% to approximately 40% by weight, the ratio of the third component is in the range of from approximately 5% to approximately 35% by weight and the ratio of the fourth component is in the range of from approximately 5% to approximately 30% by weight, based on the total weight of the liquid crystal compounds.

7. The liquid crystal composition according to any one of items 1 to 6, wherein the composition further comprises an antioxidant.

8. The liquid crystal composition according to item 7, wherein the antioxidant is a compound represented by formula (8):

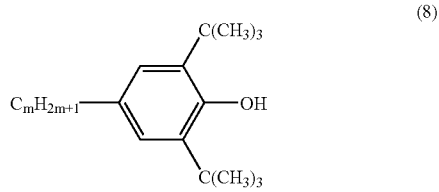

wherein m is an integer from 1 to 9.

9. The liquid crystal composition according to any one of items 7 or 8, wherein the ratio of the antioxidant is in the range of from approximately 50 ppm to approximately 600 ppm based on the total weight of the liquid crystal compounds.

10. A liquid display device comprising the liquid crystal composition according to any one of items 1 to 9.

11. The liquid crystal composition according to item 1, wherein the composition contains only one of the first component and the second component.

In other words, the composition of item 11 has a negative dielectric anisotropy and contains at least one compound selected from a group of compounds represented by formulas (1) and (2), at least one compound selected from a group of compounds represented by formula (3), and at least one compound selected from a group of compounds represented by formula (4):

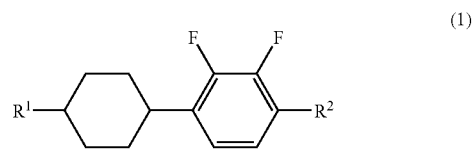

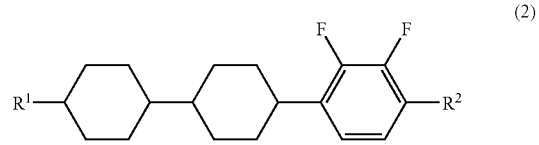

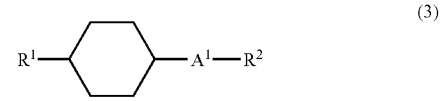

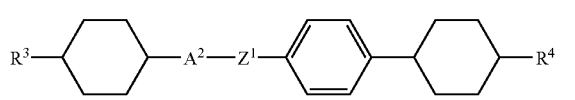

wherein the liquid crystal composition consists essentially of these compounds and wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

12. The liquid crystal composition according to item 1, wherein the ratio of the group of compounds represented by formulas (1) and (2) is in the range of from approximately 35% to approximately 90% by weight, the ratio of the group of compounds represented by formula (3) is in the range of from approximately 5% to approximately 35% by weight and the ratio of the group of compounds represented by formula (4) is in the range of from approximately 5% to approximately 30% by weight, based on the total weight of the liquid crystal compounds.

13. The liquid crystal composition according to any one of items 111 and 12, wherein the composition further contains an antioxidant.

14. The liquid crystal composition according to item 13, wherein the antioxidant is a compound represented by formula (8):

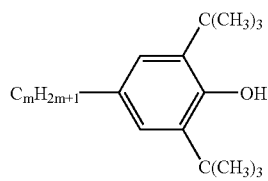

(8)

wherein m is an integer from 1 to 9.

15. The liquid crystal composition according to any one of items 13 or 14, wherein the ratio of the antioxidant is in the range of from approximately 50 ppm to approximately 600 ppm based on the total weight of the liquid crystal compounds.

16. A liquid display device containing the liquid crystal composition according to any one of items 11 to 15.

The invention further includes: (1) The composition described above, wherein the optical anisotropy is in the range from approximately 0.05 to approximately 0.11; (2) The composition described above, wherein the maximum temperature of the nematic phase is approximately 100° C. or more and the minimum temperature of the nematic phase is approximately −30° C. or less; (3) The composition described above, which further includes an optically active compound; (4) An AM device containing the composition described above; (5) A device containing the composition described above and having the mode of IPS or VA; (6) A device of a transmission type, containing the composition described above; (7) An amorphous silicon or polycrystalline silicon TFT device, containing the composition described above; (8) Use of the composition described above as a composition having a nematic phase; and (9) Use as an optically active composition by adding an optically active compound to the composition described above.

The composition of the invention will be explained in the following order. First, the main characteristics of the component compounds and the main effects of the compounds on the composition will be explained. Second, a desirable ratio of the component compounds and the basis thereof will be explained. Third, a desirable embodiment of the component compounds will be explained. Fourth, examples of the component compound will be shown. Fifth, the preparation methods of the component compound will be explained. Lastly, use of the composition will be explained.

First, the main characteristics of the component compounds and the main effects of the compounds on the composition will be explained. The main characteristics of the component compounds are summarized in Table 2. In Table 2, the letter L represents large or high, the letter M represents a middle degree and the letter S represents small or low. The numeral 0 (zero) indicates that a dielectric anisotropy is nearly zero (or very small in value).

TABLE 2

| | Characteristics of Compounds | | | |
|---|---|---|---|---|
| | (1) | (2) | (3) | (4) |
| Maximum Temperature | S | M | S | L |
| Viscosity | M | M | S | M |
| Optical Anisotropy | S | M | S | M-L |

TABLE 2-continued

| | Characteristics of Compounds | | | |
|---|---|---|---|---|
| | (1) | (2) | (3) | (4) |
| Dielectric Anisotropy | M-L (negatively large values) | M-L (negatively large values) | 0 | 0 |
| Specific Resistance | L | L | L | L |

The specific feature of the composition lies in the combination of the compounds (1) to (4). The compound (1) and the compound (2) have a large effect for increasing negatively a dielectric anisotropy of the composition. The compound (3) has a large effect for decreasing a viscosity of the composition. The compound (4) has a large effect for increasing a maximum temperature of the composition. Dielectric anisotropy of the typical component compounds is summarized in Table 3. Table 3 illustrates that a low threshold voltage for driving a device depends mainly on the compound (1) and the compound (2). The compounds are shown according to the notation in Table 4.

TABLE 3

| Dielectric Anisotropy of Compounds | | |
|---|---|---|
| Compound No. | Compound | Dielectric anisotropy |
| (1-2) | 3-HB(2F,3F)-O2 | −6.0 |
| (2-1) | 2-HHB(2F,3F)-1 | −3.6 |
| (2-2) | 5-HHB(2F,3F)-O2 | −5.9 |
| (3-1) | 3-HH-4 | 0.3 |
| (3-2) | 3-HH-O1 | −0.2 |
| (3-3) | 5-HH-V | 0.3 |
| (4-1) | 3-HHEBH-5 | −0.8 |

The main effects of the compounds on the composition will be explained. The compound (1) decreases a maximum temperature of a nematic phase, increases negatively a dielectric anisotropy, and increases a viscosity of the composition. The compound (2) increases a maximum temperature of a nematic phase, increase negatively a dielectric anisotropy, and increases a viscosity of the composition. The compound (3) decreases a maximum temperature of a nematic phase, makes a dielectric anisotropy close to zero, and decreases a viscosity of the composition. The compound (4) increases particularly a maximum temperature of a nematic phase of the composition, and makes the dielectric anisotropy of the composition close to zero.

The compound (1) includes compounds (1-1) to (1-4). The compounds (1-2) and (1-4) particularly increase negatively a dielectric anisotropy of the composition. The compound (2) includes compounds (2-1) to (2-4). The compounds (2-1) and (2-3) particularly decrease a minimum temperature of a nematic phase of the composition. The compound (2-2) and (2-4) particularly increase negatively a dielectric anisotropy of the composition. The compound (3) includes compounds (3-1) to (3-5). The compound (3-1) particularly decreases a viscosity of the composition. The compound (3-2) particularly decreases a minimum temperature of a nematic phase of the composition. The compound (3-3) decreases a minimum temperature of a nematic phase and simultaneously decreases a viscosity of the composition. The compound (4) includes compounds (4-1) to (4-4). The compound (4-1) increases a maximum temperature of a nematic phase and simultaneously decreases an optical anisotropy of the composition.

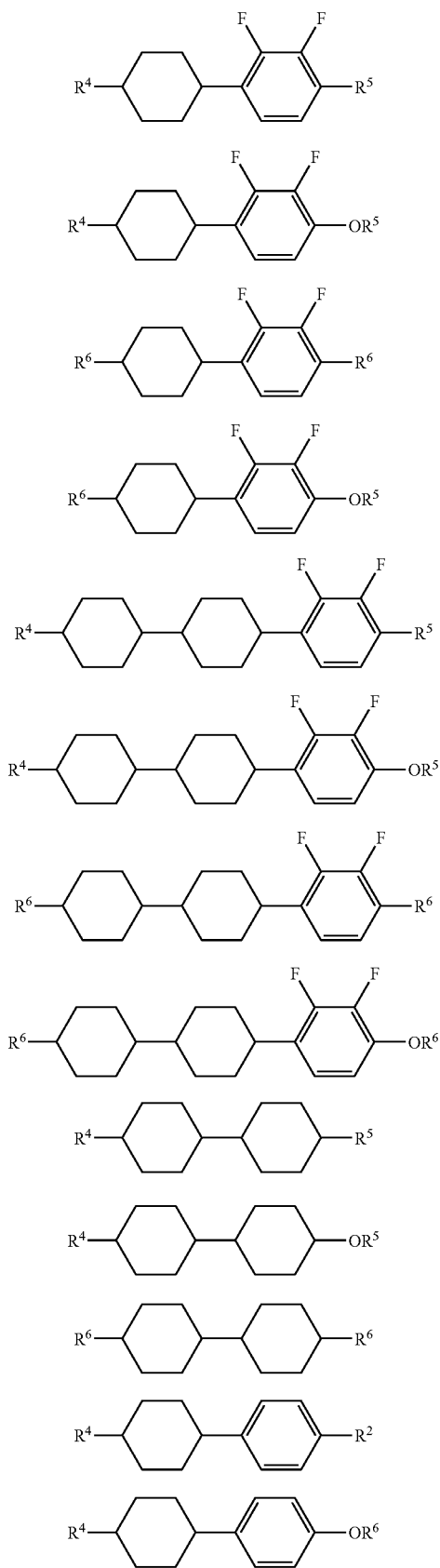

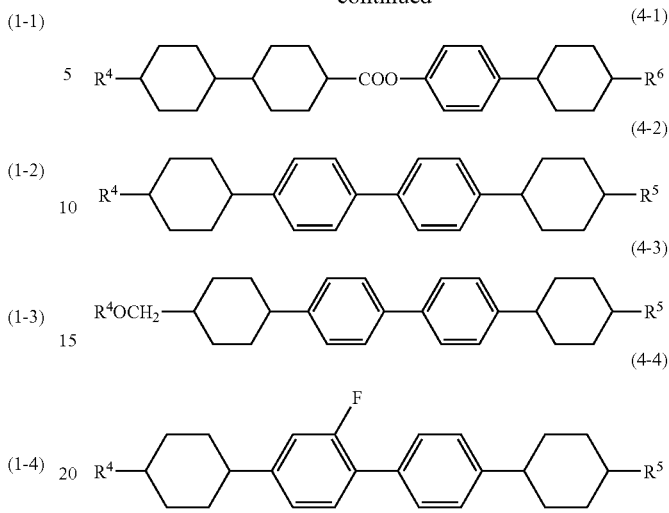

Second, a desirable ratio of the component compounds and the basis therefor will be explained. A desirable ratio of the first component is approximately 20% by weight or more for increasing negatively a dielectric anisotropy and is approximately 50% by weight or less for increasing a maximum temperature. A more desirable ratio is from approximately 25% to approximately 40% by weight for further increasing negatively a dielectric anisotropy and further increasing a maximum temperature.

A desirable ratio of the second component is approximately 15% by weight or more for increasing a maximum temperature and is approximately 40% by weight or less for decreasing a minimum temperature. A more desirable ratio is from approximately 20% to approximately 35% by weight for further increasing a maximum temperature and further decreasing a minimum temperature.

A desirable ratio of the third component is approximately 5% by weight or more for decreasing a viscosity and is approximately 35% by weight or less for increasing negatively a dielectric anisotropy. A more desirable ratio is from approximately 15% to approximately 30% by weight for further decreasing a viscosity and further increasing negatively a dielectric anisotropy.

A desirable ratio of the fourth component is approximately 5% by weight or more for increasing a maximum temperature and is approximately 30% by weight or less for decreasing a minimum temperature. A more desirable ratio is from approximately 10% to approximately 25% by weight for further increasing a maximum temperature and further decreasing a minimum temperature.

Only one of the first component and the second component may be used as a component compound. In this case, a desirable ratio of the first component or the second component is approximately 35% by weight or more for increasing negatively a dielectric anisotropy and is approximately 90% by weight or less for decreasing a viscosity. A more desirable ratio is from approximately 45% to approximately 75% by weight for further increasing negatively a dielectric anisotropy and further decreasing a viscosity.

Third, a desirable embodiment of the component compound will be explained. The symbol $R^1$ was used for many compounds in the chemical formulas for the component compounds. $R^1$ may be identical or different in these compounds. In one case, for example, $R^1$ of the compound (1) is ethyl and $R^1$ of the compound (2) is ethyl. In another case, $R^1$ of the compound (1) is ethyl and $R^1$ of the compound (2) is propyl. This rule is also applicable to the symbols $R^2$, $A^1$, $Z^1$, $X^1$, $Y^1$, and so forth.

Desirable $R^1$ is alkyl having 1 to 10 carbons or alkenyl having 2 to 10 carbons. Desirable $R^2$ is alkyl having 1 to 10 carbons or alkoxy having 1 to 10 carbons. Desirable $R^3$ is alkyl having 1 to 10 carbons or alkoxymethyl having 2 to 10 carbons. Desirable $R^4$ and $R^5$ are alkyl having 1 to 10 carbons. Desirable $R^6$ is alkenyl having 2 to 10 carbons.

Desirable alkyl is methyl, ethyl, propyl, butyl, pentyl, hexyl, heptyl, or octyl. More desirable alkyl is ethyl, propyl, butyl, pentyl, or heptyl for decreasing a viscosity.

Desirable alkoxy is methoxy, ethoxy, propoxy, butoxy, pentyloxy, hexyloxy, or heptyloxy. More desirable alkoxy is methoxy or ethoxy for decreasing a viscosity.

Desirable alkoxymethyl is methoxymethyl, ethoxymethyl, propoxymethyl, butoxymethyl, or pentyloxymethyl. More desirable alkoxymethyl is methoxymethyl for decreasing a viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl, for example, for decreasing a viscosity. A desirable configuration of —CH═CH— in these alkenyl depends on the position of a double bond. Trans is desirable in the alkenyl such as 1-propenyl, 1-butenyl, 1-pentenyl, 1-hexenyl, 3-pentenyl, and 3-hexenyl, for example, for decreasing a viscosity. Cis is desirable in the alkenyl such as 2-butenyl, 2-pentenyl and 2-hexenyl, for example, for decreasing a viscosity.

In the alkyl, the alkoxy, the alkoxymethyl and the alkenyl, a linear form is desirable in view of a viscosity of the compound.

$A^1$ is 1,4-cyclohexylene or 1,4-phenylene. $A^2$ is 1,4-cyclohexylene, 1,4-phenylene or 2-fluoro-1,4-phenylene. On the configuration of 1,4-cyclohexylene, trans is preferable to cis in consideration of a liquid crystal phase of the compound. Fluorine of 2-fluoro-1,4-phenylene is positioned on the right side or the left side of the ring. A desirable position is the right side as in the compound (4-4).

$Z^1$ is a single bond or —COO—. A bonding group of —COO— is positioned in the direction in the compound (4-1).

Fourth, examples of the component compound will be shown. In the desirable compounds described below, $R^4$ and $R^5$ are independently alkyl having 1 to 10 carbons, and $R^6$ is alkenyl having 2 to 10 carbons. More desirable alkyl or alkenyl is as described above. In these desirable compounds, trans is preferable to cis for the configuration of 1,4-cyclohexylene in consideration of a liquid crystal phase of the compound.

Desirable compound (1) is the compounds (1-1) to (1-4). More desirable compound (1) is the compound (1-1) for decreasing a production cost. Particularly desirable compound (1) is the compound (1-2) for particularly increasing negatively a dielectric anisotropy of the composition.

Desirable compound (2) is the compounds (2-1) to (2-4). More desirable compound (2) is the compounds (2-1) and (2-2) for decreasing a production cost. The compound (2-1) is particularly desirable for decreasing a viscosity of the composition. The compound (2-2) is particularly desirable for increasing negatively a dielectric anisotropy of the composition.

Desirable compound (3) is the compounds (3-1) to (3-5). More desirable compound (3) is the compounds (3-1) to (3-3) and (3-5) for decreasing a minimum temperature of the composition. Particularly desirable compound (3) is the compounds (3-1) to (3-3) for further decreasing a viscosity of the composition.

Desirable compound (4) is the compounds (4-1) to (4-4). More desirable compound (4) is the compounds (4-1), (4-3) and (4-4) for decreasing a minimum temperature of the composition. Particularly desirable compound (4) is the compound (4-1) for further decreasing a viscosity of the composition.

When an optically active compound is added to the composition, a desirable optically active compound is compounds represented by formulas (7-1) to (7-4).

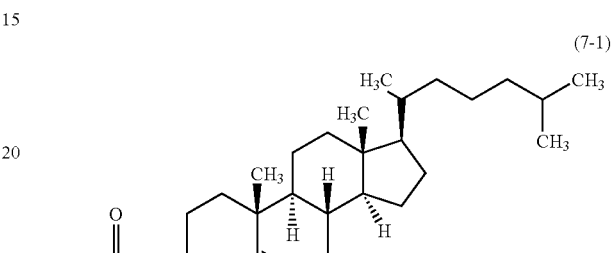

When an antioxidant is added to the composition, a desirable antioxidant is the compound (8):

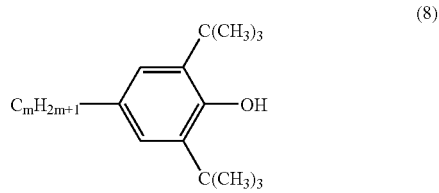

wherein m is an integer from 1 to 9. Desirable m is 1, 3, 5, 7, or 9. More desirable m is 1 and 7. When m is 1, the compound has a large volatility, and is effective in preventing the decrease of specific resistance caused by heating in the air. When m is 7, the compound has a small volatility, and is effective in maintaining a large voltage holding ratio at room temperature and also at a high temperature even after the device has been used for a long time.

Fifth, the preparation methods of the component compounds will be explained. These compounds can be prepared by known methods. The preparation method will be exemplified below. The compounds (1-2), (2-1) and (2-2) are prepared by the method disclosed in JP H2-503441 A/1990. The compound (3-1) is prepared by the method disclosed in JP S59-70624 A/1984. The compound (4-3) is prepared by the method disclosed in JP S58-219137A/1983. The compound (8), wherein m is 1, is commercially available. The compound is available, for example, from Sigma-Aldrich, Inc. The compound (8), wherein m is 7, is prepared by the method disclosed in U.S. Pat. No. 3,660,505.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The composition is prepared according to known methods using the compounds thus obtained. For example, the component compounds are mixed and dissolved in each other by heating.

Lastly, use of the composition will be explained. Most of the compositions have a minimum temperature of approximately −30° C. or less, a maximum temperature of 100° C. or more, a dielectric anisotropy of approximately −6.5 to approximately −2.0, and an optical anisotropy of approximately 0.05 to approximately 0.11. The composition having an optical anisotropy of approximately 0.05 to approximately 0.18 and further the composition having an optical anisotropy of approximately 0.05 to approximately 0.20 may be prepared by controlling ratios of the component compounds. The composition can be used as a composition having a nematic phase and as an optically active composition by adding an optically active compound.

The composition can be used for an AM device. It can also be used for a PM device. The composition can also be used for an device having a mode such as PC, TN, STN, ECB, OCB, IPS, and so forth. It is particularly desirable to use the composition for a device having a mode of VA or IPS. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

SPECIFIC EXAMPLES

The following examples are for illustrative purposes only and are not intended, nor should they be interpreted to, limit the scope of the invention.

The invention will be explained in detail by way of Examples. The invention is not limited by the Examples described below. The compounds described in the Comparative Examples and the Examples are expressed by the symbols according to the definition in Table 4 below. The parenthesized number next to the symbolized compounds in the Examples corresponds to the number of the desirable compound. A ratio (percentage) of a liquid crystal compound is percentage by weight (% by weight) based on the total weight of liquid crystal compounds. Lastly, the characteristics of the composition are summarized.

TABLE 4

Method of Description of Compound using Symbols
R—(A$_1$)—Z$_1$— ... —Z$_n$—(A$_n$)—X

| 1) Left Terminal Group R— | Symbol |
|---|---|
| $C_nH_{2n+1}$— | n— |
| $C_nH_{2n+1}O$— | nO— |
| $C_nH_{2n+1}OC_mH_{2m}$— | nOm— |
| $CH_2$=CH— | V— |
| $CH_2$=CH$C_nH_{2n}$— | Vn— |
| $CF_2$=CH— | VFF— |

| 2) Ring Structure —An— | Symbol |
|---|---|
| 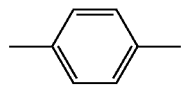 | B |
| 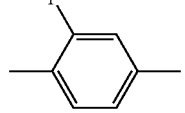 | B(2F) |
| 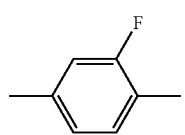 | B(F) |

TABLE 4-continued

Method of Description of Compound using Symbols
R—(A₁)—Z₁— ... —Zₙ—(Aₙ)—X

| Structure | Symbol |
|---|---|
| (benzene with 2F, 3F) | B(2F,3F) |
| (cyclohexane) | H |

| 3) Bonding Group —Zn— | Symbol |
|---|---|
| —C₂H₄— | 2 |
| —COO— | E |
| —CH₂O— | 10 |

| 4) Right Terminal Group —X | Symbol |
|---|---|
| —CₙH₂ₙ₊₁ | —n |
| —OCₙH₂ₙ₊₁ | —On |
| —CH=CH₂ | —V |
| —CH=CHCₙH₂ₙ₊₁ | —Vn |
| —Cl | —CL |

5) Example of Description

Example 1  3-HHB(2F,3F)-O2

$C_3H_7$—(cyclohexane)—(cyclohexane)—(benzene with F, F)—$OC_2H_5$

Example 2  101-HBBH-5

$CH_3OCH_2$—(cyclohexane)—(benzene)—(benzene)—(cyclohexane)—$C_5H_{11}$

Example 3  5-HH-V $C_5H_{11}$—(cyclohexane)—(cyclohexane)—CH=CH₂

---

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography. It is because the correction coefficient depends on the kind of a liquid crystal compound. Fortunately, the correction coefficient is approximately 1. Furthermore, the difference of approximately 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) are considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured−0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

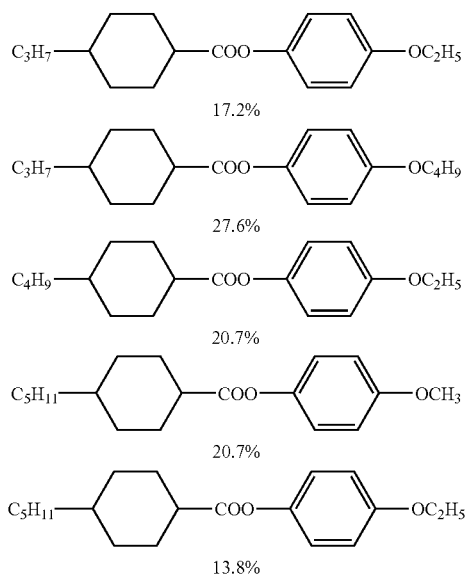

Measurement of the characteristics was carried out according to the following methods. Most methods are described in the Standard of Electric Industries Association of Japan, EIAJ ED-2521A or those with some modifications. A TFT was not attached to TN and VA devices used for measurement.

A maximum temperature of a nematic phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

A minimum temperature of a nematic phase (Tc; ° C.): A sample having a nematic phase was put in a VA device having a distance between two glass substrates (cell gap) of 4 micrometers with an antiparallel rubbing direction, and the device was sealed with an UV curable adhesive. The device was then kept in a freezer at temperatures of 0° C., -10° C., -20° C., and -30° C. for ten days, respectively, and a liquid crystal phase was observed. For example, when the sample remained in a nematic phase at -20° C. and changed to crystals (or a smectic phase) at -30° C., Tc was expressed as ≦-20° C. A lower limit of a temperature range of a nematic phase may be abbreviated to "a minimum temperature."

Optical anisotropy (Δn; measured at 25° C.): Measurement was carried out with an Abbe refractometer mounting a polarizing plate on an ocular using a light at a wavelength of 589 nanometers. The surface of a main prism was rubbed in one direction, and then a sample was dropped on the main prism. Refractive index n∥ was measured when the direction of a polarized light was parallel to that of the rubbing. Refractive index n⊥ was measured when the direction of a polarized light was perpendicular to that of the rubbing. A value of optical anisotropy was calculated from the equation: Δn=n∥−n⊥.

Dielectric anisotropy (Δ∈; measured at 25° C.): A sample having a nematic phase was put in a VA device having a distance between two glass substrates (cell gap) of 4 micrometers with an antiparallel rubbing direction, and the device was sealed with an UV curable adhesive. Sine waves (10 volts, 1 kilohertz) were impressed onto the device, and a dielectric constant (∈∥) that is parallel to a liquid crystal molecule was measured after 2 seconds. A sample was put in a TN device having a distance between two glass substrates (all gap) of a micrometers and a twist angle of 80°. Sine waves (0.5 volts, 1 kilohertz) were impressed onto the device, and a dielectric constant (∈⊥) that is perpendicular to a liquid crystal molecule was measured after 2 seconds. A value of a dielectric anisotropy was calculated from the equation; Δ∈=∈∥−∈⊥.

Frequency dependency of dielectric anisotropy (Δ∈−f; measured at -20° C.): Dielectric anisotropy at -20° C. was measured by the measurement method for dielectric anisotropy described above. The frequency of the sine wave was 100 Hz and 100 kHz, and ∈∥ or ∈⊥ was measured after 6 seconds from impressing a voltage. Frequency dependency of dielectric anisotropy was a value obtained by subtracting a dielectric anisotropy measured at 100 kHz from a dielectric anisotropy measured at 100 Hz. It was determined that when the value was as close as to zero, frequency dependency of dielectric anisotropy was small. That is, the sample was excellent in frequency dependency of dielectric anisotropy. Frequency dependency of dielectric anisotropy may be abbreviated to "frequency dependency."

Threshold voltage (Vth; measured at 25° C.; V): Measurements were carried out with LCD Evaluation System Model LCD-5100 made by Otsuka Electronics Co., Ltd. Light source is a halogen lamp. A sample was poured into a VA device of a normally black mode, in which a cell gap between two glass plates was 4 micrometers with an antiparallel rubbing direction, and the device was sealed with an UV curable adhesive. Voltage to be impressed onto the device (70 Hz, rectangular waves) was stepwise increased by 0.02 volt starting from zero volt up to 20 volts. During the stepwise increasing, a light was irradiated to the device in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 10% transmittance.

Temperature dependency of threshold voltage (Vth–T; V): Threshold voltage was measured at 20° C. and 70° C. by the measurement method for threshold voltage described above. Temperature dependency of threshold voltage was a value obtained by subtracting a threshold voltage measured at 70° C. from a threshold voltage measured at 20° C. It was determined that when the value was as close as to zero, temperature dependency of threshold voltage was small, that is, the sample was excellent in temperature dependency of threshold voltage. Temperature dependency of threshold voltage may be abbreviated to "temperature dependency."

Voltage holding ratio (VHR; measured at 25° C. and 100° C.; %): A TN device used for measurement has a polyimide-alignment film and the cell gap between two glass plates is 4.5 micrometers. A sample was poured into the device, and then the device was sealed with an adhesive which is polymerized by the irradiation of ultraviolet light. The TN device was impressed and charged with pulse voltage (60 microseconds at 5 volts). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B. A voltage holding ratio obtained at 25° C. was expressed as VHR-1. A voltage holding ratio obtained at 100° C. was expressed as VHR-2. Next, this TN device was heated at 100° C. for 250 hours. Separately, this TN device was irradiated with an ultraviolet ray (UV). The irradiation condition was a high-pressure mercury lamp (USH-500D, produced by Ushio, Inc., 500 W) as an UV light source, a distance between the light source and the device of 20 cm, and an irradiation time of 20 minutes. VHR-3 is a voltage holding ratio measured at 25° C. after heating. VHR-4 is a voltage holding ratio measured at 100° C. after heating. VHR-5 is a voltage holding ratio measured at 25° C. after irradiation with UV. VHR-6 is a voltage holding ratio measured at 100° C. after irradiation with UV. VHR-1 and VHR-2 correspond to evaluation of a device at the initial stage. VHR-3 and VHR-4 correspond to evaluation of a device after it has been used for a long time. VHR-5 and VHR-6 correspond to evaluation of light stability of a device.

Response time ($\tau$; measured at 25° C.; millisecond): Measurement was carried out with LCD Evaluation System Model LCD-5100 made by Otsuka Electronics Co., Ltd. Light source is a halogen lamp. Low-pass filter was set at 5 kilohertz. A sample was poured into a VA device of a normally black mode, in which a cell gap between two glass plates was 4 micrometers with an antiparallel rubbing direction, and the device was sealed with an UV curable adhesive. Rectangle waves (70 Hertz, a voltage where a transmission of 100% was obtained in the measurement of threshold voltage, 0.5 seconds) was impressed to the device. During impressing, a light was irradiated to the device in a perpendicular direction, and an amount of the light passing through the device was measured. A maximum amount of a light corresponds to 100% transmittance, and a minimum amount of a light corresponds to 0% transmission. Fall time ($\tau f$) is a period of time required for the change in transmittance from 100% to 0%. Response time is the fall time.

Rotation viscosity ($\gamma 1$; measured at 25° C.; mPa·s): Rotation viscosity was measured according to the method disclosed in M. Imai, et al., Molecular Crystals and Liquid Crystals, Vol. 259, p. 37 (1995). A sample was placed in VA device of a normally black mode, in which a cell gap between two glass plates was 4 micrometers with an antiparallel rubbing direction, and the device was sealed with an UV curable adhesive. The VA device was impressed with a voltage in a range of from 10 V to 20 V stepwise by 1 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. Rotation viscosity was obtained from the measured values and the calculating equation (8) in the literature by M. Imai, et al. As the dielectric anisotropy necessary for the calculation, the value measured by the measuring method of dielectric anisotropy described above was used.

Gas chromatographic Analysis: Gas Chromatograph Model GC-14B made by Shimadzu was used for measurement. Carrier gas is helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared into an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (length 50 meters, bore 0.25 millimeters, film thickness 0.25 micrometers) made by Shimadzu Corporation may be used. An area ratio of each peak in the gas chromatogram corresponds to a ratio of the component compound. Percentage by weight of the component compound is not completely identical to an area ratio of each peak. According to the invention, however, percentage by weight of the component compound may be regarded to be identical to an area ratio of each peak, when these capillary columns are used. This is because there is no significant difference in correction efficient of component compounds.

Comparative Example 1

Example 1 was chosen from the compositions disclosed in JP H10-176167 A/1998. The basis is that the composition contains the compound (1), the compound (2) and the compound (3) of the invention, and has the highest maximum temperature. The components and characteristics of the composition are as follows. The composition has a low maximum temperature and a large temperature dependency of threshold voltage.

| 3-HB(2F,3F)-O2 | (1-2) | 12% |
|---|---|---|
| 5-HB(2F,3F)-O2 | (1-2) | 11% |
| 3-HHB(2F,3F)-O2 | (2-2) | 15% |
| 5-HHB(2F,3F)-O2 | (2-2) | 15% |
| 3-HH-4 | (3-1) | 5% |
| 3-HH-5 | (3-1) | 5% |
| 3-HH-O1 | (3-2) | 6% |
| 3-HH-O3 | (3-2) | 6% |
| 3-HB-2 | (3-4) | 4% |
| 3-HB-O1 | (3-5) | 4% |
| 3-HHEH-3 | (—) | 5% |
| 3-HHEH-5 | (—) | 6% |
| 4-HHEH-3 | (—) | 6% |

NI=91.3° C.; $T_C \leq -30$° C.; $\Delta n$=0.076; $\Delta \in$=-3.2; Vth-T=0.16 V; VHR-1=99.0%.

Comparative Example 2

Example 4 was chosen from the compositions disclosed in JP 2000-96055 A/2000. The basis is that the composition contains the compound (1), the compound (2), the compound (3) and the compound (4) of the invention. The components and characteristics of the composition are as follows. The composition has a low maximum temperature, a negatively small dielectric anisotropy and a large temperature dependency of threshold voltage.

| | | |
|---|---|---|
| 5-HB(2F,3F)-O2 | (1-2) | 14% |
| 2-HHB(2F,3F)-1 | (2-1) | 6.5% |
| 3-HHB(2F,3F)-O2 | (2-2) | 14% |
| 5-HHB(2F,3F)-O2 | (2-2) | 14% |
| 3-HHEB(2F,3F)-O2 | (—) | 6% |
| 3-HH-4 | (3-1) | 5% |
| 3-HH-5 | (3-1) | 5% |
| 3-HH-O1 | (3-2) | 10% |
| 5-HH-O1 | (3-2) | 9% |
| 5-HH-V | (3-3) | 4.5% |
| 5-HB-3 | (3-4) | 10% |
| 3-HHEBH-5 | (4-1) | 2% |

NI=85.1° C.; $T_C \leq -30$° C.; $\Delta n$=0.072; $\Delta\epsilon$=−2.5; Vth-T=0.30 V; VHR-1=99.1%.

Comparative Example 3

Example 7 was chosen from the compositions disclosed in JP 2001-354967 A/2001. The basis is that the composition contains the compound (1), the compound (2), the compound (3) and the compound (4) of the invention, and has the highest maximum temperature. The components and characteristics of the composition are as follows. The composition has a low maximum temperature and a large temperature dependency of threshold voltage.

| | | |
|---|---|---|
| 3-HB(2F,3F)-O4 | (1-2) | 14% |
| 5-HB(2F,3F)-O2 | (1-2) | 7% |
| 5-HB(2F,3F)-O4 | (1-2) | 18% |
| 3-HHB(2F,3F)-O2 | (2-2) | 13% |
| 2-HBB(2F,3F)-O2 | (—) | 12% |
| 3-HBB(2F,3F)-O2 | (—) | 12% |
| 3-HH-5 | (3-1) | 5% |
| 3-HH-V1 | (3-3) | 8% |
| 5-HH-V | (3-3) | 8% |
| 3-HHEBH-3 | (4-1) | 3% |

NI=80.6° C.; $T_C \leq -30$° C.; $\Delta n$=0.101; $\Delta\epsilon$=−4.4; Vth-T=0.27 V; VHR-1=99.0%.

Comparative Example 4

Example 16 was chosen from the compositions disclosed in JP 2003-13065 A/2003. The basis is that the composition contains the compound (1), the compound (2) and the compound (3) of the invention, and has the highest maximum temperature. The components and characteristics of the composition are as follows. The composition has a low maximum temperature, a negatively small dielectric anisotropy and a large temperature dependency of threshold voltage.

| | | |
|---|---|---|
| 3-HB(2F,3F)-O4 | (1-2) | 4% |
| 5-HB(2F,3F)-O2 | (1-2) | 12% |
| 5-HB(2F,3F)-O4 | (1-2) | 9% |
| 1-HHB(2F,3F)-O2 | (2-2) | 12% |
| 2-HBB(2F,3F)-O2 | (—) | 13% |
| 3-HBB(2F,3F)-O2 | (—) | 13% |
| 3-HH-5 | (3-1) | 6% |
| 3-HH-V1 | (3-3) | 11% |
| 5-HH-V | (3-3) | 12% |
| 3-HH1OH-3 | (—) | 3% |
| 4-HH1OH-3 | (—) | 3% |
| 3-HBB-2 | (—) | 2% |

NI=86.0° C.; $T_C \leq -30$° C.; $\Delta n$=0.097; $\Delta\epsilon$=−3.2; Vth-T=0.16 V; VHR-1=98.9%.

Example 1

| | | |
|---|---|---|
| 3-HB(2F,3F)-O2 | (1-2) | 18% |
| 5-HB(2F,3F)-O2 | (1-2) | 18% |
| 3-HHB(2F,3F)-O2 | (2-2) | 12% |
| 5-HHB(2F,3F)-O2 | (2-2) | 12% |
| 3-HH-4 | (3-1) | 5% |
| 3-HH-O1 | (3-2) | 7% |
| 5-HH-V | (3-3) | 5% |
| 3-HB-O2 | (3-5) | 3% |
| 3-HHEBH-3 | (4-1) | 10% |
| 3-HHEBH-5 | (4-1) | 10% |

NI=106.5° C.; $T_C \leq -30$° C.; $\Delta n$=0.086; $\Delta\epsilon$=−3.4; $\gamma 1$=64.3 mPa·s; Vth-T=0.09 V; $\Delta\epsilon$-f=−0.53; VHR-1=99.2%.

Example 2

| | | |
|---|---|---|
| 5-HB(2F,3F)-1 | (1-1) | 3% |
| 3-HB(2F,3F)-O2 | (1-2) | 16% |
| 5-HB(2F,3F)-O2 | (1-2) | 17% |
| 3-HHB(2F,3F)-1 | (2-1) | 3% |
| 3-HHB(2F,3F)-O2 | (2-2) | 11% |
| 5-HHB(2F,3F)-O2 | (2-2) | 11% |
| 3-HH-O1 | (3-2) | 7% |
| 5-HH-V | (3-3) | 10% |
| 5-HB-3 | (3-4) | 3% |
| 3-HHEBH-3 | (4-1) | 7% |
| 3-HHEBH-5 | (4-1) | 7% |
| 1O1-HBBH-5 | (4-3) | 5% |

NI=100.5° C.; $T_C \leq -30$° C.; $\Delta n$=0.087; $\Delta\epsilon$=−3.3; $\Delta 1$=84.6 mPa·s; Vth-T=0.06 V; $\Delta\epsilon$-f=−0.23; VHR-1=99.2%.

Example 3

| | | |
|---|---|---|
| 3-HB(2F,3F)-O2 | (1-2) | 16% |
| 5-HB(2F,3F)-O2 | (1-2) | 16% |
| V2-HB(2F,3F)-O2 | (1-4) | 4% |
| 3-HHB(2F,3F)-O2 | (2-2) | 10% |
| 5-HHB(2F,3F)-O2 | (2-2) | 12% |
| V2-HHB(2F,3F)-O2 | (2-4) | 4% |
| 3-HH-4 | (3-1) | 5% |
| 3-HH-V1 | (3-3) | 5% |
| 5-HH-V | (3-3) | 10% |
| 3-HHEBH-3 | (4-1) | 9% |
| 3-HHEBH-5 | (4-1) | 9% |

NI=111.3° C.; $T_C \leq -30$° C.; $\Delta n$=0.087; $\Delta\epsilon$=−3.6; $\gamma 1$=89.5 mPa·s; Vth-T=0.08 V; $\Delta\epsilon$-f=−0.77; VHR-1=99.0%.

Example 4

| | | |
|---|---|---|
| 3-HB(2F,3F)-O2 | (1-2) | 18% |
| 5-HB(2F,3F)-O2 | (1-2) | 18% |
| 3-HHB(2F,3F)-1 | (2-1) | 3% |
| 3-HHB(2F,3F)-O2 | (2-2) | 10% |

-continued

| | | |
|---|---|---|
| 5-HHB(2F,3F)-O2 | (2-2) | 10% |
| 3-HH-4 | (3-1) | 5% |
| 3-HH-O1 | (3-2) | 11% |
| 3-HB-O2 | (3-5) | 3% |
| 3-HHEBH-3 | (4-1) | 9% |
| 3-HHEBH-5 | (4-1) | 9% |
| 3-HB(F)BH-3 | (4-4) | 4% |

NI=107.2° C.; $T_C \leq -30°$ C.; $\Delta n=0.088$; $\Delta\epsilon=-3.5$; $\gamma 1=93.9$ mPa·s; Vth-T=0.07 V; $\Delta\epsilon$-f=-0.57; VHR-1=99.0%.

Example 5

| | | |
|---|---|---|
| 3-HB(2F,3F)-O2 | (1-2) | 18% |
| 5-HB(2F,3F)-O2 | (1-2) | 18% |
| 3-HHB(2F,3F)-O2 | (2-2) | 12% |
| 5-HHB(2F,3F)-O2 | (2-2) | 12% |
| 3-HH-4 | (3-1) | 5% |
| 3-HH-O1 | (3-2) | 7% |
| 5-HH-V | (3-3) | 5% |
| 3-HB-O2 | (3-5) | 3% |
| 3-HHEBH-3 | (4-1) | 10% |
| 3-HHEBH-5 | (4-1) | 10% |

An antioxidant of the compound (8) wherein m is 1 was added in an amount of 200 ppm to the above composition. The composition had the following characteristics: NI=106.5° C.; $T_C \leq -30°$ C.; $\Delta n=0.086$; $\Delta\epsilon=-3.4$; $\gamma 1=64.3$ mPa·s; Vth-T=0.09 V; $\Delta\epsilon$-f=-0.53; VHR-1=99.2%.

Example 6

| | | |
|---|---|---|
| 5-HB(2F,3F)-1 | (1-1) | 3% |
| 3-HB(2F,3F)-O2 | (1-2) | 16% |
| 5-HB(2F,3F)-O2 | (1-2) | 17% |
| 3-HHB(2F,3F)-1 | (2-1) | 3% |
| 3-HHB(2F,3F)-O2 | (2-2) | 11% |
| 5-HHB(2F,3F)-O2 | (2-2) | 11% |
| 3-HH-O1 | (3-2) | 7% |
| 5-HH-V | (3-3) | 10% |
| 5-HB-3 | (3-4) | 3% |
| 3-HHEBH-3 | (4-1) | 7% |
| 3-HHEBH-5 | (4-1) | 7% |
| 1O1-HBBH-5 | (4-3) | 5% |

An antioxidant of the compound (8) wherein m is 7 was added in an amount of 300 ppm to the above composition. The composition had the following characteristics: NI=100.5° C.; $T_C \leq -30°$ C.; $\Delta n=0.087$; $\Delta\epsilon=-3.3$; $\gamma 1=84.6$ mPa·s; Vth-T=0.06 V; $\Delta\epsilon$-f=-0.23; VHR-1=99.2%.

Although the invention has been described and illustrated with a certain degree of particularity, it is understood that the present disclosure has been made only by way of example, and that numerous changes in the conditions and order of steps can be resorted to by those skilled in the art without departing from the spirit and scope of the invention.

What is claimed is:

1. A composition having a negative dielectric anisotropy comprising a liquid crystal consisting essentially of at least one compound selected from a group of compounds represented by formula (1) as a first component, at least one compound selected from a group of compounds represented by formula (2) as a second component, at least one compound selected from a group of compounds represented by formula (3) as a third component and at least one compound selected from a group of compounds represented by formula (4) as a fourth component:

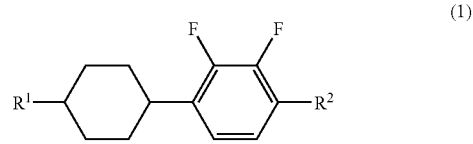

(1)

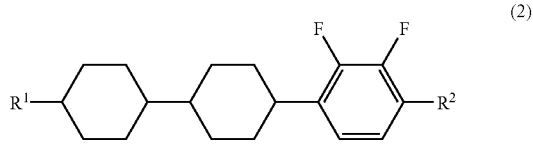

(2)

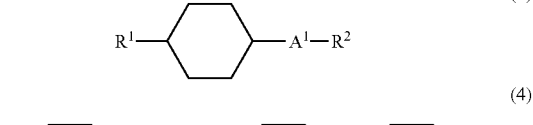

(3)

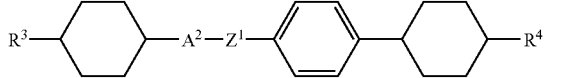

(4)

wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

2. The liquid crystal composition according to claim 1, wherein the ratio of the first component is in a range of from approximately 20% to approximately 50% by weight, the ratio of the second component is in a range of from approximately 15% to approximately 40% by weight, the ratio of the third component is in a range of from approximately 5% to approximately 35% by weight and the ratio of the fourth component is in a range of from approximately 5% to approximately 30% by weight, based on the total weight of the liquid crystal compounds.

3. A composition having a negative dielectric anisotropy comprising a liquid crystal component consisting essentially of at least one compound selected from a group of compounds represented by formula (1-2) as the first component, at least one compound selected from a group of compounds represented by formulas (2-1) and (2-2) as the second component, at least one compound selected from a group of compounds represented by formulas (3-1) to (3-3) as the third component and at least one compound selected from a group of compounds represented by formula (4-1) as the fourth component:

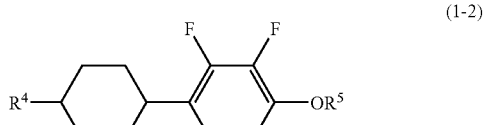

(1-2)

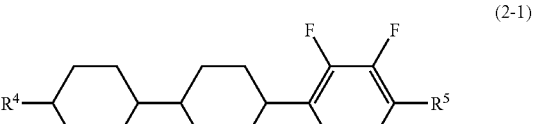

(2-1)

-continued

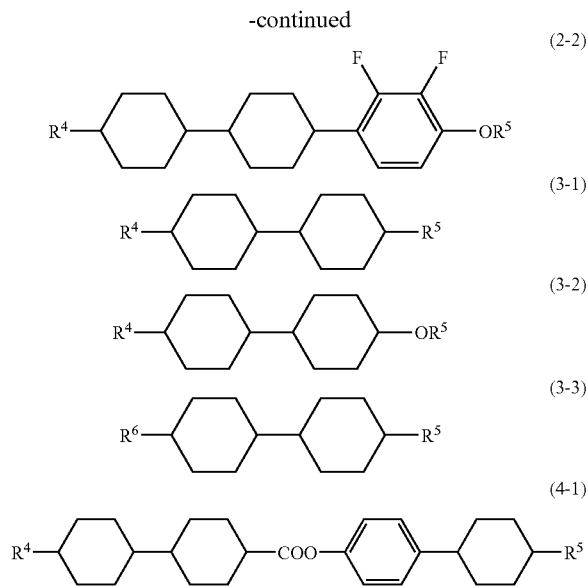

wherein $R^4$ and $R^5$ are independently alkyl; and $R^6$ is alkenyl.

4. The liquid crystal composition according to claim 3, wherein the second component is at least one compound selected from a group of compounds represented by formula (2-2).

5. The liquid crystal composition according to claim 3, wherein the second component is at least one compound selected from a group of compounds represented by formula (2-1) and at least one compound selected from a group of compounds represented by formula (2-2).

6. The liquid crystal composition according to claim 3, wherein the ratio of the first component is in a range of from approximately 20% to approximately 50% by weight, the ratio of the second component is in a range of from approximately 15% to approximately 40% by weight, the ratio of the third component is in a range of from approximately 5% to approximately 35% by weight and the ratio of the fourth component is in a range of from approximately 5% to approximately 30% by weight, based on the total weight of the liquid crystal compounds.

7. A composition having a negative dielectric anisotropy comprising (a) a liquid crystal component consisting essentially of at least one compound selected from a group of compounds represented by formula (1) as the first component, at least one compound selected from a group of compounds represented by formula (2) as the second component, at least one compound selected from a group of compounds represented by formula (3) as the third component and at least one compound selected from a group of compounds represented by formula (4) as the fourth component:

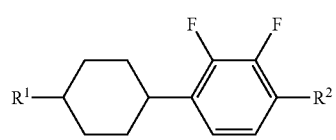

-continued

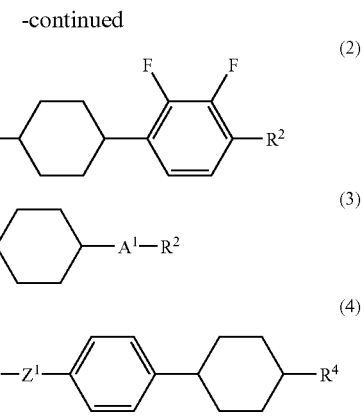

wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; and $Z^1$ is a single bond or —COO—.

(b) at least one antioxidant.

8. A composition having a negative dielectric anisotropy comprising (a) a liquid crystal component consisting essentially of at least one compound selected from a group of compounds represented by formula (1) as a first component, at least one compound selected from a group of compounds represented by formula (2) as a second component, at least one compound selected from a group of compounds represented by formula (3) as a third component and at least one compound selected from a group of compounds represented by formula (4) as a fourth component:

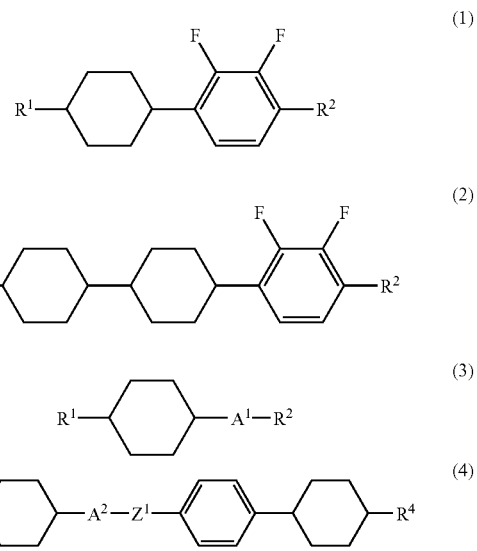

wherein $R^1$ is alkyl or alkenyl; $R^2$ is alkyl or alkoxy; $R^3$ is alkyl or alkoxymethyl; $R^4$ is alkyl; $A^1$ is 1,4-cyclohexylene or 1,4-phenylene; $A^2$ is 1,4-cyclohexylene, 1,4-phenylene or 2-fluoro-1,4-phenhlene; $Z^1$ is a single bond or —COO—; and m is an integer from 1 to 9; and (b) an antioxidant represented by formula (8).

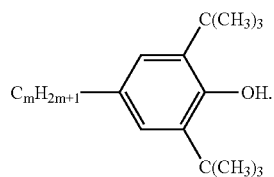

(8)

9. The liquid crystal composition according to claim 7, wherein the ratio of the antioxidant is in a range of from approximately 50 ppm to approximately 600 ppm based on the total weight of the liquid crystal compounds.

10. The liquid crystal composition according to claim 8, wherein the ratio of the antioxidant is in a range of from approximately 50 ppm to approximately 600 ppm based on the total weight of the liquid crystal compounds.

11. A liquid display device comprising the liquid crystal composition of claim 1.

12. A liquid display device comprising the liquid crystal composition of claim 3.

13. A liquid display device comprising the liquid crystal composition of claim 7.

14. A liquid display device comprising the liquid crystal composition of claim 8.

* * * * *